United States Patent
Beier et al.

(10) Patent No.: US 10,733,318 B2
(45) Date of Patent: Aug. 4, 2020

(54) PROCESSING ANALYTICAL QUERIES OVER ENCRYPTED DATA USING DYNAMICAL DECRYPTION

(71) Applicant: International Business Machines Corporation, Armonk, NY (US)

(72) Inventors: Felix Beier, Holzgerlingen (DE); Peter Bendel, Holzgerlingen (DE); Nicole Finnie, Böblingen (DE); Namik Hrle, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/818,917

(22) Filed: Nov. 21, 2017

(65) Prior Publication Data
US 2019/0156051 A1 May 23, 2019

(51) Int. Cl.
*G06F 21/62* (2013.01)
*H04L 9/00* (2006.01)
*G06F 21/60* (2013.01)

(52) U.S. Cl.
CPC ........ *G06F 21/6227* (2013.01); *G06F 21/602* (2013.01); *G06F 21/6236* (2013.01); *H04L 9/008* (2013.01)

(58) Field of Classification Search
CPC .............. G06F 21/6227; G06F 21/602; G06F 21/6236; H04L 9/008
See application file for complete search history.

(56) References Cited

U.S. PATENT DOCUMENTS

| | | | | |
|---|---|---|---|---|
| 4,375,579 | A * | 3/1983 | Davida | G06F 21/72 380/28 |
| 7,797,342 | B2 * | 9/2010 | Banks | G06F 21/6227 707/783 |
| 9,087,212 | B2 | 7/2015 | Balakrishnan et al. | |
| 9,747,456 | B2 | 8/2017 | Arasu et al. | |
| 10,303,895 | B1 * | 5/2019 | McCluskey | G06F 21/6245 |
| 2001/0056541 | A1 * | 12/2001 | Matsuzaki | G06F 21/6218 713/193 |

(Continued)

OTHER PUBLICATIONS

Arasu et al., "Querying Encrypted Data", SIGMOD' 14, Jun. 22-27, 2014, Snowbird, UT, USA (Year: 2014).*

(Continued)

*Primary Examiner* — Tongoc Tran
(74) *Attorney, Agent, or Firm* — Cantor Colburn LLP; Richard Wilhelm

(57) ABSTRACT

Aspects of the invention include processing queries in a database system having a first database engine and a second database engine. A first instance of a first table is stored in the first database engine in plaintext. At one predefined column of the first table is encrypted, resulting in a set of encrypted columns, using a cascade encryption scheme that includes a set of ordered encryption methods. A subset of the set of columns is stored in a second instance of the first table in the second database engine. An encryption method of the cascade encryption scheme that allows a query operation of a received query on data encrypted with the identified encryption method is identified. The identified encryption method is used to rewrite the query, and the rewritten query is executed using the second instance of the first table.

4 Claims, 4 Drawing Sheets

(56) References Cited

U.S. PATENT DOCUMENTS

| | | | |
|---|---|---|---|
| 2004/0243593 A1* | 12/2004 | Stolte | G06F 17/246 |
| 2004/0243816 A1* | 12/2004 | Hacigumus | H04L 9/0894 |
| | | | 713/193 |
| 2004/0255133 A1* | 12/2004 | Lei | G06F 21/6227 |
| | | | 713/193 |
| 2006/0126843 A1 | 6/2006 | Brickell | |
| 2007/0107063 A1* | 5/2007 | Eckleder | G11B 20/00086 |
| | | | 726/27 |
| 2008/0033960 A1* | 2/2008 | Banks | G06F 21/6227 |
| 2010/0278338 A1* | 11/2010 | Chang | G09C 1/00 |
| | | | 380/200 |
| 2011/0113050 A1* | 5/2011 | Youn | G06F 21/6218 |
| | | | 707/757 |
| 2011/0202353 A1* | 8/2011 | Neuendorf | G10L 19/20 |
| | | | 704/500 |
| 2012/0278635 A1* | 11/2012 | Hars | G06F 12/14 |
| | | | 713/193 |
| 2015/0178305 A1* | 6/2015 | Mueller | G06F 16/221 |
| | | | 707/693 |
| 2016/0283728 A1 | 9/2016 | Antonopoulos et al. | |
| 2017/0046195 A1* | 2/2017 | Yang | G06F 9/466 |
| 2017/0103227 A1 | 4/2017 | Kerschbaum et al. | |
| 2019/0114438 A1* | 4/2019 | Hersans | G06F 21/602 |
| 2019/0206487 A1* | 7/2019 | Chen | G11C 13/003 |
| 2019/0220468 A1* | 7/2019 | Hrle | G06F 16/273 |

OTHER PUBLICATIONS

Hacigumus et al. "Executing SQL over Encrypted Data in the Database-Service-Provider Model", ACM SIGMOD' 2002, Jun. 4-6. (Year: 2002).*

CSA Cloud Security Alliance, (Top Threats Working Group, "The Nortorious Nine, Cloud Computing Top Threats in 2013"), Feb. 2013, pp. 1-21. (Year: 2013).*

Harizopoulos et al."OLTP Through the Looking Glass, and What we Found There", SOG<PD '08, Jun. 9-12, 2008, Vancouver, BC, Canada (Year: 2008).*

Singh, G., "Design and Analysis of OCPA Secure Encrypted Databases,", Master Project, Computer Science and Engineering, Indian Institude of Science, Bangalore, Jul. 2014, 1-33. (Year: 2014).*

J. Angeline Martina et al., "SecDBaaS With SQL Operations Over Encrypted Database For Real Time Data in Cloud Environment," IJSRD, vol. 3, Issue 03, 2015, 9 pages.

Rasha Refaie et al., "A New Efficient Algorithm For Executing Queries Over Encrypted Data," Research Gate, Dec. 2015, 7 pages.

* cited by examiner

PROCESSING ANALYTICAL QUERIES OVER ENCRYPTED DATA USING DYNAMICAL DECRYPTION

BACKGROUND

The present invention relates to processing queries in computer database systems, and more specifically to processing analytical queries over encrypted data using dynamic decryption.

SUMMARY

Embodiments of the present invention include methods, systems, and computer program products for processing analytical queries over encrypted data using dynamic decryption. A non-limiting example method includes storing, in plain text, a first instance of a first table in a first database engine of a database system. A cascade encryption scheme including an ordered set of encryption methods is provided. A column of the first table is encrypted multiple times, using one of the encryption methods each time in accordance with the order, resulting in a respective set of encrypted columns. A subset of the set of encrypted columns is stored in a second instance of the first table. The second instance of the first table is stored in a second database engine of the database system. Encryption information about the ordered set of encryption methods and encryption keys used for encryption in the database system is maintained. A query is received against the first table, the query indicating a query operation on at least the column. The encryption information is used to identify the encryption method of at least the cascade encryption scheme that allows the query operation on data encrypted by the identified encryption method. The received query is rewritten against the second instance of the first table based at least on the identified encryption method. The rewritten query is processed on the second instance of the first table.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
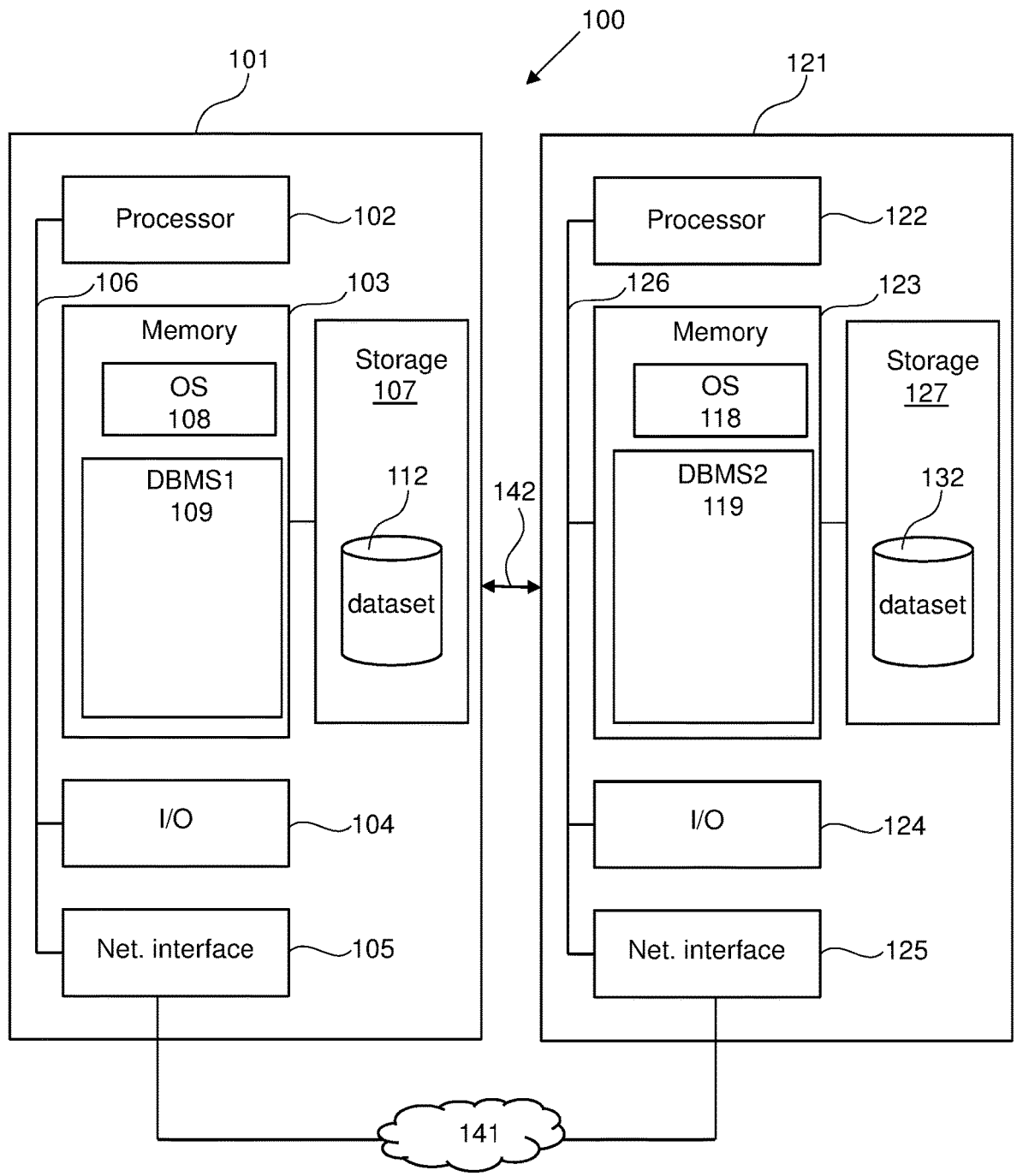
FIG. 1 depicts a data processing system in accordance with one or more embodiments of the present invention.

One or more embodiments described herein include a database system such as, but not limited to, a hybrid database management system (DBMS). In order to address a multitude of workload types with different requirements and goals, embodiments of the database system are composed from more than one execution engine (e.g., a first database engine and a second database engine) such that each of the execution or database engines have a respective set of resources adapted to run on the datasets available at the execution engine. For example, a first database engine may be a transactional engine that may require less resources compared to a second database engine that is an analytical engine as its data may be smaller in size.

As used herein, the term "data is stored in a DBMS" means that the DBMS controls access and has access to the data, with the data being stored in a storage device of the computer system that includes or implements the DBMS.

The term "data table" or "table" as used herein refers to a collection of data that is presented in tabular form. Each column in a data table represents a particular variable or attribute. Each row in a data table represents a given member, record, or entry of the data table.

The term "trusted engine" as used herein refers to an engine that fulfills one or more predefined security criteria. An untrusted engine is an engine that does not fulfill at least one of the predefined security criteria. The trusted engine may, for example, include an access control component that controls access to data of the trusted engine such that only authorized users can access the data (e.g. the authorized users may use login information that are accepted by the trusted engine). The trusted engine may implement a DBMS, and the DBMS may be referred to as a trusted DBMS.

One or more embodiments of the present invention provide an automatic end-to-end solution where table data can be loaded from one source database (e.g., a trusted DBMS) in an unencrypted form to a target database (e.g., an untrusted DBMS) in an encrypted form. Analytical queries may be computed directly on encrypted data when running the queries on untrusted DBMSs. When compared to accessing unencrypted data using a trusted DBMS, this can result in shorter query runtimes, or lower query costs.

One or more embodiments of the present invention provide mapping from a column of a trusted DBMS of a first database engine to one or multiple encrypted columns using the same value encrypted in multiple encryption layers or methods. Reducing the number of encrypted columns (the subset of columns) provides the ability to defer the decryption to the query runtime (dynamic decryption), and thus, minimize data storage for encrypted columns physically stored on the untrusted DBMS of the second database engine. The minimization of storage for column data can be realized by packing data resulting from the encryption using compatible encryption algorithms together in multiple layers stored in one column as well as dynamically decrypting encrypted values in memory.

One or more embodiments of the present invention provide reduction in logging and locking overhead due to fewer encrypted columns being required. Reducing storage complexity as a trade-off of runtime complexity can improve query/data manipulation language (DML) concurrency between the trusted DBMS and the untrusted DBMS.

Assuming for example, that two encryption methods "m1" and "m2" are successively applied to encrypt a value "v". The value v may be unencrypted or encrypted using another set of nested cascaded encryption methods. The application of method m1 on value v results in encrypted value "v1" and the application of method m2 on encrypted value v1 results in encrypted value "v12". The two encryption methods m1 and m2 are compatible if a query operation allowed by method m2 can be executed on encrypted value v12 and provides the same result as the result of applying the same query operation on the value v or on value v2, where v2 may be the result of applying the encryption method m2 on value v directly. A query operation is allowed by a given encryption method when the query operation can be executed on data encrypted by the given encryption method. In other words, m1 and m2 are compatible if the effects of m1 are transparent for query processing on the encrypted value v12 that yields from applying a cascade encryption scheme that applies m1 and m2 consecutively on input value v.

For example, the provided cascade encryption scheme may include encryption methods in this order: m1, followed by m2, followed by "m3". In this case methods m1 and m2 are compatible and methods m3 and m2 are compatible. In another example, if a value is encrypted using two incompatible methods, for example if a deterministic (DET) encryption method is followed by a homomorphic (HOM) encryption method, SQL operations such as SUM may not be performed on the HOM layer, because the values have been changed. For example, if a column "C1" has a value of "1" and "C2" has a value of "2", and C1 and C2 are encrypted using a DET method, the resulting values are "AA" and "BB". The resulting values are then encrypted using a HOM encryption method. Performing the operation SUM(C1, C2) on the result of the HOM encryption, will lead to an incorrect result, because the HOM method encrypts the values AA, BB instead of the values 1 and 2. The operation SUM will lead to correct results only if AA+BB=1+2; and this is the case only if the HOM encryption method is compatible with the DET encryption method.

Thus, in accordance with one or more embodiments of the present invention, the provided cascade encryption scheme is based on compatibility between encryption methods. Determining compatibility may, for example, be performed using a compatibility matrix of encryption methods that denotes what encryption methods are compatible. Embodiments of the cascade encryption scheme can include compatible encryption methods only. Alternatively they can include compatible encryption methods followed by a non-deterministic encryption method (e.g. a random encryption method) as the outer most layer, which allows the data to be stored in a more secure manner in an untrusted DBMS.

The set of encryption methods can be ordered in accordance with their security level. For example, the more secure that a method is, the lower it is in the order of methods. In addition, or alternatively, the ordering of the encryption methods is based on the compatibility between the encryption methods. For example, if the set of encryption methods includes eight methods that are compatible, the eight methods may be ordered based on their security levels. In another example, the set of encryption methods are ordered in accordance with a user defined order (e.g., the order may be input by a user). If a value is encrypted using all eight encryption methods, a separate meaningful operation can be performed on each layer of the encrypted data.

For example, a cascade encryption scheme "SCH1" may include the encryption method "meth1" followed by "meth2" and "meth3." The application of the cascade encryption scheme SCH1 on a column "C" (e.g. including 10 attribute values) may be performed as follows. The column C (each of the 10 values) is first encrypted using the method meth1. This results in a first encrypted column "EC1." The column EC1 (each the 10 encrypted values) is encrypted using the method meth2. This results in a second encrypted column "EC2." The column EC2 (each the 10 encrypted values) is encrypted using the method meth3. This results in a third encrypted column "EC3." In one example, the encryption is performed for all columns values (e.g. 10 values) at the first database engine and the subset of columns (e.g. EC2 and EC3) are sent to the second database engine. In another example, the encryption is performed value by value, and the result of encryption (e.g., value of EC2 and EC3) is sent value by value to the second database engine.

The set of encrypted columns that result from the encryption of the column at the first database engine may exist temporarily at the first database engine and be deleted after the subset of encrypted columns is stored at the second database engine. The rewritten query may be sent to the second database engine for the processing of the rewritten query. The rewritten query may further indicate or include one or more keys necessary for decrypting at least part of the subset of columns for executing the rewritten query. The decryption of the data for processing the rewritten query may be performed dynamically (on the fly) by temporarily storing the results of the decryption in the main memory of the second database engine, and after processing the rewritten query the results of the decryption in memory may be deleted. This may reduce locking and logging overhead by dynamically decrypting cypher text in memory. According to an embodiment, the method further includes, in response to determining two successive methods of the encryption methods, deleting the encryption column of the set of encryption columns corresponding to the highest ordered encryption method of the two methods. Following the example of scheme SCH1, there is no need to store EC1, because column EC1 can be obtained from EC2. EC1 corresponds to meth1 which is ordered higher than meth2. This embodiment requires less storage space by combining encryptions into as few columns as possible.

According to an embodiment, the subset of encrypted columns includes a single encrypted column resulting from application of the last encryption method of the set of encryption methods. Following the example of scheme SCH1, the subset of columns includes single column EC3 which results from the application of the last ordered encryption method meth3 (after applying meth1 and meth2). This embodiment may further save storage space.

According to an embodiment, the rewritten query involves a processing operation on a subset of columns for enabling processing data encrypted by the identified encryption method of the set of encryption methods (or data resulted from the encryption using all methods of the set that are ordered higher than the identified encryption method and the identified encryption method). For example, if the received query involves an equality predicate "C=5" and the identified encryption method is meth1, the rewritten query may be "EC1=VV" where "VV" is the result of encrypting value 5 using meth1. The processing of the rewritten query results in values or entries of column EC1 that satisfy the equality predicate. The resulting values of EC1 are sent back to the first database engine, where the first database engine decrypts the resulting values using keys associated with the method meth1. For example, the first database engine upon sending the rewritten query may receive the resulting values of EC1 and an indication that the received resulting values of EC1 is the result of processing the sent rewritten query.

According to an embodiment, the rewritten query involves a decryption operation for decrypting the single column until reaching the level of the identified encryption method (or until obtaining data or a layer of data that is encrypted by the identified encryption method and the other encryption methods ordered higher than the identified encryption method). Following the example of SCH1, if the identified encryption method is meth1, the column EC3 is first decrypted using the key of meth3, and the resulting decrypted column EC2 is decrypted using the key of meth2 in order to obtain EC1. The rewritten query may then be executed on the resulting column EC1 since its query operation can be executed on data encrypted using meth1. The columns EC1 and EC2 may only be stored on main memory of the second database engine while executing the rewritten query and may be deleted after computing the rewritten query. If the received query involves an equality predicate such as "C=5" and in case the subset of columns includes only EC3, the rewritten query indicates a decryption operation of EC3 (and decryption of resulting EC2) to obtain EC1 and the result of decryption is compared with VV, e.g. "DECRYPT(EC3)=VV", where DECRYPT is a user defined function. In one example, the function DECRYPT has the key to perform decryption as an argument: DECRYPT(EC3, key)=VV.

According to an embodiment, the execution of the rewritten query includes temporarily storing the results of the decryption of at least part of the subset of columns in a memory, computing the rewritten query using the decrypted data and deleting the stored results after computing the rewritten query. This embodiment provides the peeling off of encryption layers dynamically, with the decrypted values only temporarily existing in memory, not on disk; and thus, may not cause log overheads. This prevents having to decrypt encrypted values of columns on disk and it does not require locking on the persistent storage for parallel SQLs or queries.

According to an embodiment, using another column of the first table is repeated, resulting in another set of encrypted columns. A subset of the other set of columns can be stored on the second instance of the first table. When a query indicates another query operation on the other column, another encryption method of the encryption scheme is identified that allows the other query operation on data encrypted by the other identified encryption method. The rewriting of the query is performed based on at least one of the identified encryption methods. The other identified encryption method may be the same or different from the identified encryption method. The other column (e.g. column D) is be encrypted using the provided cascade encryption scheme. Following the example of scheme SCH1, the encryption of column D results in encrypted columns "ED1", "ED2" and "ED3." The methods applied using EC1-3 may similarly be applied for columns ED1-3. If for example, the two identified methods of the cascade encryption scheme are different, one of the two methods is selected for rewriting the query. The selection of the method may, for example, be based on the order of the method in the cascade encryption scheme. For example, the method having the lowest order is selected, which results in peeling fewer layers compared to the higher ordered method. Selecting the method having the higher order may add runtime complexity and may expose weaker encrypted values in memory of the untrusted system and on the wire when results are transferred back to the trusted system.

According to an embodiment, another cascade encryption scheme involving another ordered set of encryption methods is provided. The column is encrypted multiple times using each time a method of the other set of encryption methods in accordance with the order, resulting in another set of encrypted columns. A subset of the other set of columns is stored on the second instance of the first table. The identifying of the encryption method is performed on the two cascade encryption schemes, where the rewriting of the query is performed based on at least on one of identified encryption methods that result from the identifying steps. For example, for each of the encryption schemes, it is determined which encryption method allows the query operation. This results in identifying an encryption method of the cascade encryption scheme and/or other cascade encryption schemes. If two methods of the two encryption schemes are found to satisfy the query operation, one of the two schemes is selected and used (i.e. encrypted data or columns) to rewrite the query. For example, one of the two schemes may randomly be chosen. In another example, the scheme causing the lowest decryption overhead is used. For that, the scheme that involves the lowest number of layers to be removed (assuming uniform overheads for each possible layer decryption method) is selected. That selection may be performed in another example by maintaining a cost model for each possible method and storing it in the catalog 207 shown in FIG. 2 (e.g., homomorphic de/encryption is 10 times costlier than an order-preserving one and an order-preserving method is 5 times costlier than an equality-preserving one). The cost model may be used to select the scheme.

According to an embodiment, the set of encryption methods includes, but is not limited to: an order preserving encryption, a deterministic encryption, and a non-deterministic encryption in order. Other examples of sets of encryption methods are described with reference to diagrams 301A-D of FIG. 3.

According to an embodiment, if the query operation is a read only operation, the identified encryption method is a non-deterministic encryption method.

According to an embodiment, if the query operation is an order operation (e.g. involving a SQL ORDER BY operation), the identified encryption method is an order preserving encryption method.

According to an embodiment, it is determined that the first table is modified and the encrypting and storing are repeated for modified values of the first table. This embodiment provides an efficient method for updating the data on the second database engine. This may enable access to up-to-date data. For example, only modified data is encrypted using the cascade encryption scheme and stored on corresponding columns of the existing second instance of the first table.

According to an embodiment, the database system is a hybrid online transaction processing (OLTP) and online analytical processing (OLAP) database system, where the first database engine is configured for performing OLTP processes, and the second database engine is configured for performing OLAP processes. This embodiment may seamlessly be integrated in existing data warehouse systems.

According to an embodiment, the first database engine is a trusted engine and the second database engine is an untrusted engine.

Turning now to FIG. 1, a block diagram for a data processing system 100 for a hybrid DBMS is generally shown in accordance with one or more embodiments of the present invention. The data processing system 100 includes a first computer system 101 (also referred to as first database engine or transactional engine) connected to a second computer system 121 (also referred to as second database engine, analytical engine or accelerator engine). The first computer system 101 may, for example, include an IBM® System Z®. The second computer system 121 may, for example, include an IBM Netezza system.

The data processing system 100 may be a distributed system hosted as a hybrid cloud, including the first computer system 101 and a second computer system(s) 121, where the first computer system 101 may include a trusted on-premises DBMS and the one or more second computer system(s) 121 may each include untrusted DBMS. The second computer system(s) 121 may be hosted in a public cloud.

As shown in FIG. 1, first computer system 101 includes processor 102, memory 103, I/O circuitry 104 and network interface 105 coupled together by bus 106. Processor 102 may represent one or more processors (e.g. microprocessors). The memory 103 can include any one or combination of volatile memory elements (e.g., random access memory (RAM) such as dynamic RAM (DRAM), static RAM (SRAM), synchronous DRAM (SDRAM), etc.) and non-volatile memory elements (e.g., read only memory (ROM)), erasable programmable ROM (EPROM)), electronically erasable programmable ROM (EEPROM), and programmable ROM (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magnet, optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs (e.g., DBMS1 109), each of which includes an ordered listing of executable instructions for implementing logical functions, notably functions involved in embodiments of this invention. The software in memory 103 can also include a suitable operating system (OS) 108. The OS 108 can control the execution of other computer programs for implementing at least part of methods as described herein.

DBMS1 109 may have access to and/or control of a first dataset 112 stored on storage device 107. The first dataset 112 may, for example, includes transaction data that provides real time or near real time transaction data for OLTP analysis such as postings from a manufacturing control system.

Second computer system 121 shown in FIG. 1 includes processor 122, memory 123, input/output (I/O) circuitry 124 and network interface 125 coupled together by bus 126. Processor 122 may represent one or more processors (e.g. microprocessors). The memory 123 can include any one or combination of volatile memory elements (e.g., RAM such as DRAM, SRAM, SDRAM, etc.) and nonvolatile memory elements (e.g., ROM, EPROM, EEPROM, and PROM). Note that the memory 123 can have a distributed architecture, where various components are situated remote from one another, but can be accessed by the processor 122.

Memory 123 in combination with persistent storage device 127 of the second computer system 121 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs, such as DBMS2 119, each of which includes an ordered listing of executable instructions for implementing logical functions, notably functions involved in embodiments of this invention. The software in memory 123 can include a suitable OS 128. The OS 128 essentially controls the execution of other computer programs for implementing at least part of methods as described herein.

DBMS2 119 may have or control access to a second dataset 132 stored on storage device 127 of the second computer system 121. For example, the second dataset 132 may be obtained by replicating or copying a source dataset such as the first dataset 112 from the first computer system 101 to the second computer system 121. The second dataset 132 may include at least part of the attributes of the first dataset 112. For example, the second dataset 132 may include for a given attribute more attribute values than attribute values of the given attribute in the first dataset 112.

The second computer system 121 may thus be a target of data of the first computer system 101 in that data of the first computer system 101 may be replicated or copied into the second computer system. FIG. 1 depicts for exemplification purpose only one target computer system (the second computer system 121). However, the first computer system 101 may be connected to multiple target computer systems such as the second computer system 121. Each of the target computer system may include a respective untrusted DBMS.

The first dataset 112 and second dataset 132 may be stored in different formats. The formats may differ in encryption, compression, row-oriented vs. column-oriented storage, etc. For example, the first dataset 112 may be in plaintext format and the second dataset 132 may be in an encrypted format.

First computer system 101 and second computer system 121 may be independent computer hardware platforms communicating through a high-speed connection 142 or a network 141 via network interfaces 105, 125. The network 141 may for example include a local area network (LAN), a general wide area network (WAN), and/or a public network (e.g., the Internet). Every first computer system 101 and second computer system 121 may be responsible for managing its own copies of the data.

Although shown in FIG. 1 as separate systems, the first and second computer systems 101 121 may, in another embodiment, belong to a single system (e.g. sharing a same memory and processor hardware) while each of the first and second computer systems is associated with a respective DBMS and datasets (e.g., the two DBMSs may be stored in the shared memory). In another embodiment, the two database management systems DBMS1 109 and DBMS2 119 form part of a single DBMS that provides communications and methods performed by DBMS1 109 and DBMS2 119 as described herein.

The data processing system 100 may for example categorize every incoming query and execute it on one of the first and second computer systems 101 121. The first computer system 101 may be responsible for efficient lookup in transactional workloads (OLTP) and may, for example, be optimized for accessing limited amounts of data (e.g. of the first dataset 112). The second computer system 121 may, for example, be responsible for data scans in the scope of analytical applications (OLAP), which may be required to read large amounts of data in a single query.

Figure 2:
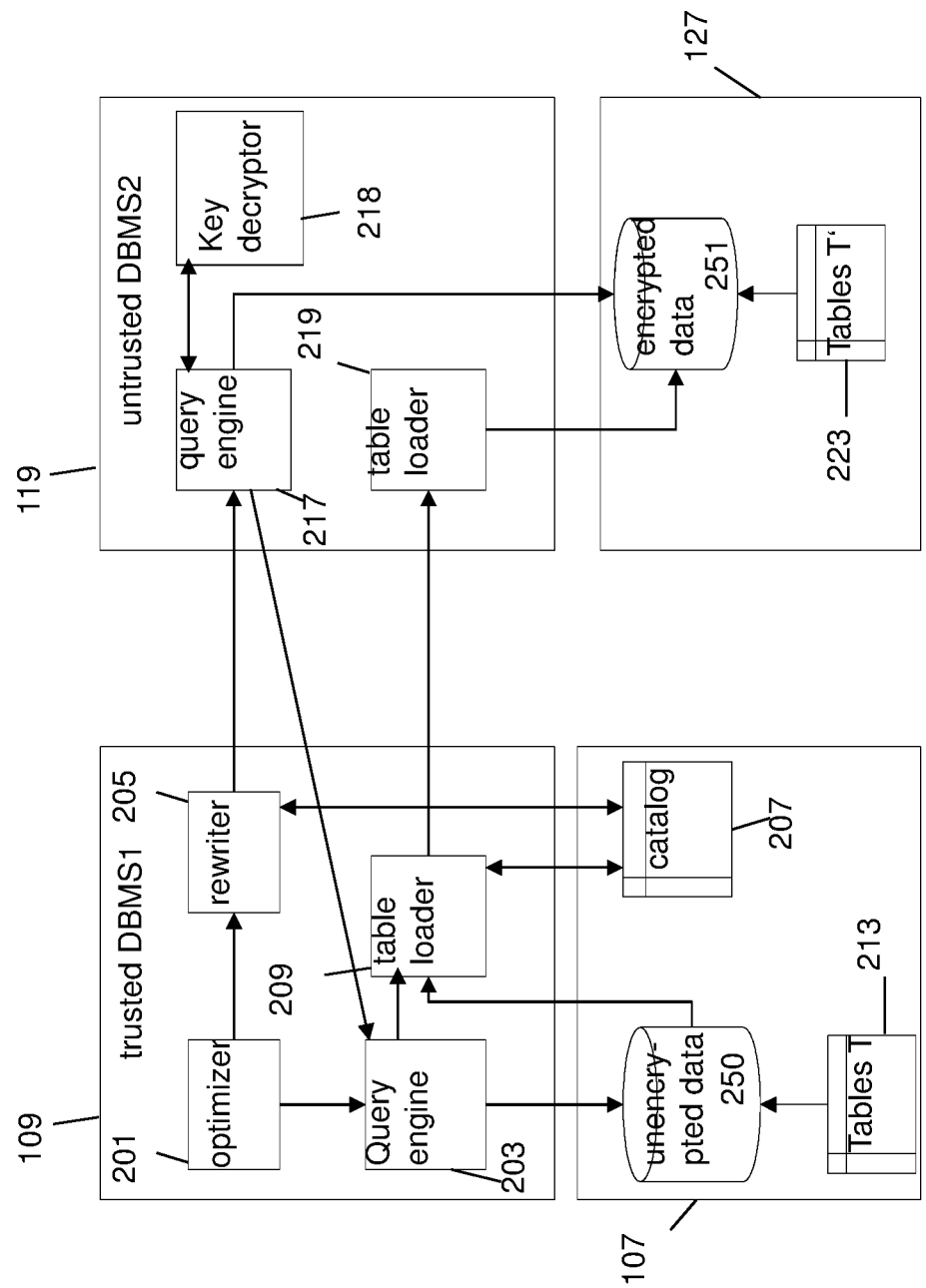
FIG. 2 is a diagram illustrating the components of database management systems of a data processing system in accordance with one or more embodiments of the present invention.

FIG. 2 is a diagram illustrating the components of the two database management systems DBMS1 109 and DBMS2 119 for processing data such as first dataset 112 and second dataset 132 in accordance with one or more embodiments of the present invention. DBMS1 109 is referred is a trusted DBMS and DBMS2 119 is an untrusted DBMS. The trusted DBMS1 109 includes a query optimizer 201. The query optimizer 201 may, for example, be configured for generating or defining query plans for executing queries (e.g., on first dataset 112).

The trusted DBMS1 109 shown in FIG. 2 further includes a query engine 203 for computing or executing queries.

The trusted DBMS1 109 shown in FIG. 2 further includes a rewriter 205 that is configured for rewriting queries (e.g. rewriting queries received at the optimizer 201). For example, a query received by the trusted DBMS1 109 may refer to one or more columns or attributes of the first dataset 112. The rewriter 205 may be configured for rewriting that query such that it refers to other columns (e.g., of the second dataset 132) that correspond to the columns referenced in the received query.

The trusted DBMS1 109 shown in FIG. 2 further includes a table loader 209. The rewriter 205 and table loader 209 may be configured to access a catalog 207 (e.g., which is part of storage device 107). The catalog 207 may for example be a persistent storage where encryption information is stored. Examples of encryption information are further described with reference to FIGS. 3-5 below.

The table loader 209 may, for example, be configured for transferring data from the trusted DBMS1 109 to untrusted DBMS2 119. The table loader 209 may be a pluggable component to the trusted DBMS1 109, implemented as a stored procedure, a user-defined function (UDF), or other programs.

The untrusted DBMS2 119 shown in FIG. 2 includes a query engine 217 that is configured to receive queries from the rewriter 205. The queries received by the query engine 217 may be queries rewritten by the rewriter 205 of the trusted DBMS1 109. The untrusted DBMS2 119 further includes a table loader 219. The table loader 219 of the untrusted DBMS2 119 may be configured to receive data to be stored on the untrusted DBMS2 119 from the table loader 209 of the trusted DBMS1 109. The received data by the table loader 219 of the untrusted DBMS2 119 may be in an encrypted format as indicated in FIG. 2 and may be stored in tables 223 whose columns correspond to at least part of the columns of the tables 213 that are encrypted.

The table data of table 213 accessed by the trusted DBMS1 109 may be stored in an unencrypted form in storage 250 (e.g. in file systems and/or memory) as shown in FIG. 2. The table data in tables 223 of the untrusted DBMS2 119 may be stored in an encrypted form in storage 251 (e.g. in file systems and/or memory). The decrypted form of the loaded table data in storage accessible by the untrusted DBMS2 119 may be consistent with the table data of the tables 213 of the trusted DBMS1 109 and can be inversely decrypted to the original data.

The untrusted DBMS2 119 shown in FIG. 2 further includes a key decryptor 218. Key decryptor 218 may be one or multiple UDFs, stored procedures, or any programmable components, which decrypt ciphertext encrypted in multiple encryption methods. The key decryptor 218 may be configured to pass the decrypted ciphertext to query engine 217, and this decrypted ciphertext may be used as intermediate data and may be stored in memory only. The encrypted ciphertext may be stored on disk in the second database engine.

Figure 3:
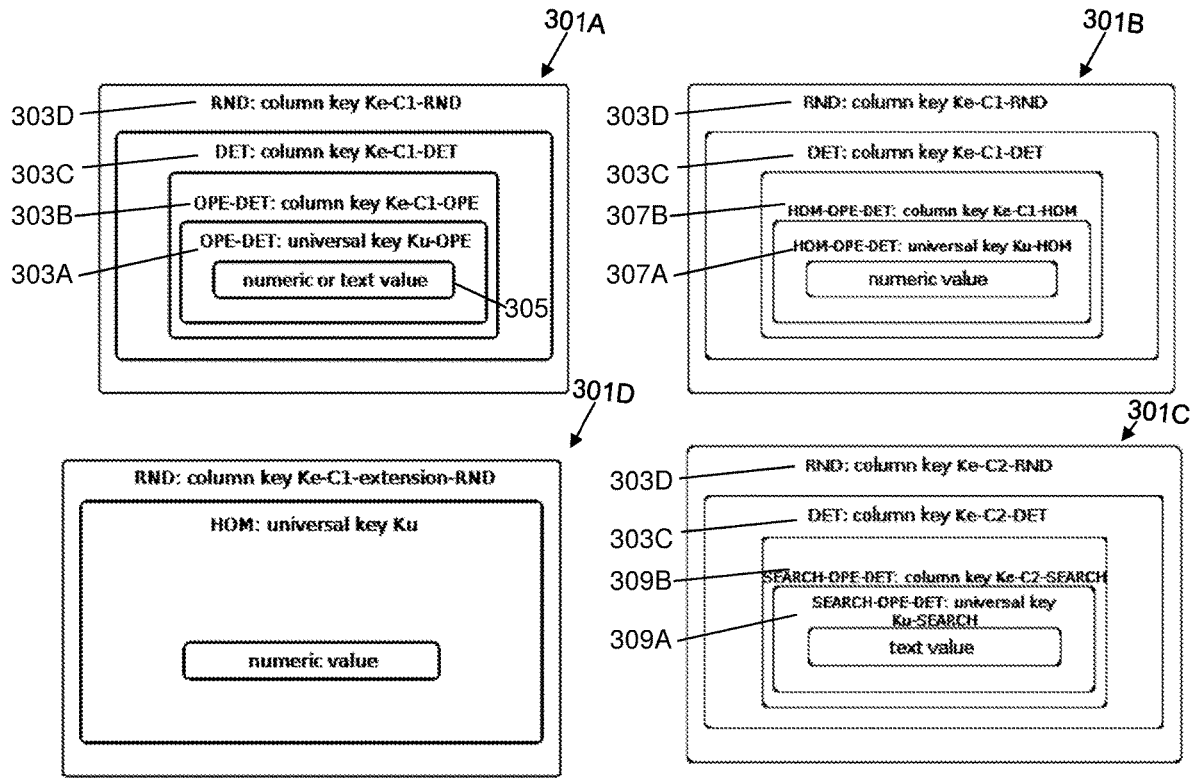
FIG. 3 depicts diagrams of cascade encryption scheme examples in accordance with one or more embodiments of the present invention.

FIG. 3 depicts diagrams 301A-D, each illustrating an encryption scheme in accordance with one or more embodiments of the present invention. The encryptions schemes shown in FIG. 3 are cascade or multiple encryption schemes, where a cascade encryption scheme supports encrypting a value one or more times, either using the same or a different encryption method. A cascade encryption scheme involves an ordered set of encryption methods. The order may be performed based on the security level or strength of the encryption methods. For example, the more secure the encryption method the lowest the order assigned to the encryption method. The highest ordered encryption method of the set is first applied and the lowest ordered encryption method of the set is last applied. Having the last applied encryption method of the encryption scheme (lowest ordered) as the most secure method allows for securely storing the resulting encrypted value after applying all encryption methods of the scheme.

Diagram 301A illustrates a cascade encryption scheme that involves an ordered set of encryption methods 303A-303D, where the encryption method 303A is first ordered (or highest ordered) followed by encryption method 303B, 303C and then 303D. At least part of the encryption methods 303A-D may be different and may use different encryption keys.

Applying the encryption scheme of diagram 301A on a numeric or text value 305 involves the encryption of the numeric or text value 305 multiple times using the encryption methods 303A-D in accordance with their order. In other terms, the numeric or text value is encrypted in multiple encryption layers. Each layer is encrypted in a respective encryption method using a respective encryption key. The encryption methods 303A-D are referred to herein as encryption layers. For example, the numeric or text value in unencrypted format (e.g. plaintext) may not be stored on the untrusted DBMS2 119 and may only exist on the trusted DBMS1 109. This provides secure storage of data. The untrusted DBMS2 119 may include the numeric or text value in encrypted format.

In accordance with one or more embodiments of the present invention, a layer of the multiple encryption methods 303A-D can be skipped or new encryption layers can be added as long as they're compatible with each other.

For example, using the cascade encryption scheme of diagram 301A, the numeric or text value 305 may first be encrypted using the encryption method 303A, resulting in a first encrypted value (e.g. the first encrypted values form a first layer). The first encrypted value is further encrypted by the following encryption method 303B resulting in a second encrypted value (e.g. the second encrypted values form a second layer). The second encrypted value is further encrypted by the following encryption method 303C resulting in a third encrypted value (e.g. the third encrypted values form a third layer). The third encrypted value is further encrypted by the following encryption method 303D resulting in a fourth encrypted value (e.g. the fourth encrypted values form a fourth layer).

The first encryption method 303A involving an order-preserving and deterministic (OPE-DET) encryption technique allows encryption of the numeric or text value 305 with a universal key "Ku-OPE" using a OPE-DET encryption method. The first encryption method 303A may allow JOIN operations or range-JOIN operations across columns and tables including the data encrypted by the first encryption method 303A. Data encrypted by the first encryption method 303A forms an inner-most OPE-DET layer or first layer of encrypted data.

The second encryption method 303B involves an OPE-DET encryption technique that provides encryption of data with a column-specific key e.g. "Ke-C1-OPE" using the aforementioned OPE-DET encryption technique. The second encryption method may allow JOIN, ORDER BY, equality predicate operations on a column C1 including the data encrypted by the second encryption method 303B (after applying the first encryption method). This may be done without exposing the encrypted value of the inner-most OPE-DET layer. Data encrypted by the second encryption method 303B after applying the first encryption method 303A on the data forms a second layer of encrypted data. For example, the query involving an ORDER BY operation may be executed on the second layer of data without having to have access to the first layer of data.

The third encryption method 303C involves a DET encryption technique that provides encryption of data with a column-specific key "Ke-C1-DET" using a DET encryption technique. The third encryption method 303C may allow equality predicate operations on a column C1 including the data encrypted by the third encryption method 303B (after applying the first and second encryption methods). This may be performed without exposing the inner encrypted layers (i.e. first and second layers) such as OPE-DET layer that reveals ordering. The previous encryption method 303B OPE-DET is compatible with the encryption method 303C. Data encrypted by the third encryption method 303C after applying the second and the first encryption methods 303A-B on the data forms a third layer of encrypted data. For example, the query involving an equality predicate operation may be executed on the third layer of data without having to have access to the first and second layer of data.

The fourth encryption method 303D involves a random (RND) non-deterministic encryption technique that provides encryption of data with a column-specific key "Ke-C1-RND" using a RND encryption technique. The fourth encryption method 303D may allow no SQL operations on a column C1 containing encrypted data resulting from the encryption method RND. Data encrypted by the fourth encryption method 303D after applying the third, second and the first encryption methods 303A-303C on the data forms a fourth layer or out-most layer of encrypted data.

The encryption methods 303A-303D may be combined with another compatible encryption method by using a compatibility matrix stored in a persistent storage (such as catalog 207) to record what encryption methods are compatible.

For example, a homomorphic encryption method that allows summations or aggregations performed on numeric columns may be combined with the encryption methods 303A-D, only if it is compatible with order-preserving and deterministic encryption schemes. The first encryption method 303A and the second encryption method 303B may be compatible with a homomorphic encryption method because the homomorphic encryption method may be order-preserving and deterministic, and thus the encryption methods 303A-B can each be combined as illustrated in diagram 301B, with a homomorphic (HOM) encryption method. The HOM encryption method is combined with the order-preserving deterministic encryption methods 303A-B resulting in the respective HOM-OPE-DET methods 307A-B using universal key Ku-HOM and column specific key Ke-C1-HOM. Thus, the diagram 301B indicates another cascade encryption scheme that may be applied on numeric values, which resulted from the combination described above. The cascade encryption scheme of diagram 301B includes the encryption methods in the following order: encryption methods 307A, 307B, 303C and 303D. The cascade encryption scheme of diagram 301B may be suitable for numeric columns.

In another example, the encryption methods 303A-B may be combined with a search encryption method for character columns as illustrated in diagram 301C. The search encryption method that allows text search on character columns may be combined with or added to the encryption methods 303A-B only if it is compatible with order-preserving and deterministic encryption. Since the first encryption method 303A and second encryption method 303B are compatible with a search encryption method because the search encryption method may be order-preserving and deterministic, the encryption methods 303A-B can each be combined as illustrated in diagram 301B, with a search (SEARCH) encryption method. The SEARCH encryption method is combined with the order-preserving deterministic encryption methods 303A-B resulting in the respective SEARCH-OPE-DET methods 309A-B using universal key Ku-SEARCH and column specific key Ke-C2-SEARCH. The diagram 301C indicates the cascade encryption scheme that may be applied on string or character values of a column C2. The cascade encryption scheme of diagram 301C includes the encryption methods in the following order: encryption methods 309A, 309B, 303C and 303D.

Diagram 301D illustrates another cascade encryption scheme involving a HOM encryption method followed by a RND encryption method. The cascade encryption scheme of diagram 301D may be applied on numeric values. The inner homomorphic layer of encryption scheme of diagram 301D may use a universal key, so summations and aggregations can be performed across columns and tables.

In accordance with one or more embodiments, encryption information stored in catalog 207 includes an indication of each of the encryption schemes of diagrams 301A-301D. The encryption information may, for example, indicate the encryption methods (e.g., 303A-303D) of each encryption scheme in associations with encryption keys as indicated in FIG. 3 as well as the order in which the encryption method may be applied. For example, encryption method 303A may be indicated in association with encryption key Ku-OPE. Encryption method 303B may be indicated in association with encryption key Ke-C1-OPE. Encryption method 303C may be indicated in association with encryption key Ke-C1-DET. Encryption method 303D may be indicated in association with encryption key Ke-C1-RND.

In addition, the encryption information may also include, for each of the encryption schemes, or methods, the query operations that are allowed by the respective encryption methods. For example, the encryption information may indicate that the OPE encryption method allows ORDER BY, MIN, MAX, SORT, etc. to be executed on data encrypted by the OPE encryption method. For example, the OPE encryption method may preserve the order of original data, if "x<y, OPE(x)<OPE(y)", where "OPE(x)" is the encrypted value of "x", and "OPE(y)" is the encrypted value of "y."

The encryption information may further indicate that the deterministic encryption method allows equality predicates, equality joins, GROUP BY, COUNT, DISTINCT, etc. to be executed on data encrypted by the DET encryption method.

The encryption information may further indicate that the homomorphic encryption method allows aggregate functions (e.g., "SUM(x+y)") to be executed on data encrypted by the HOM encryption method.

Figure 4:
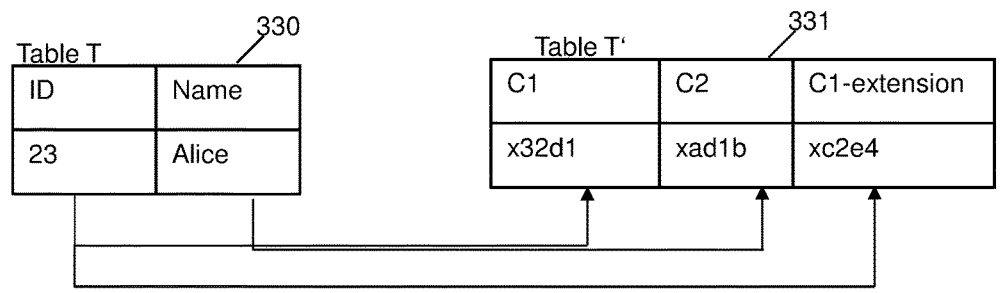
FIG. 4 illustrates the relation between content of tables of the trusted and untrusted database management systems in accordance with one or more embodiments of the present invention.

Turning now to FIG. 4, example contents of a table T 330 of the tables 213 of the trusted DBMS1 109 are generally shown in accordance with one or more embodiments of the present invention. The table 330 contains two columns "ID" and "Name" having example values "23" and "Alice" respectively. For example, the ID column of table T 330 may be encrypted by the cascade encryption scheme of diagram 301A using the encryption methods 303A-303D, and the resulting encrypted values stored in respective column C1 of table T' 331 of the tables 223 of the untrusted DBMS2 119. The encrypted value "x32d1" is the result of applying the encryption methods 303A-303D in order (e.g., x32d1) and is the fourth layer data. In other words, only the values encrypted in non-deterministic encryption method 303D (RND) may be stored in Table T' (e.g., on disk storage). Less securely encrypted values such as encrypted values of DET layer OPE-DET may not be stored on disk but only temporarily exist in working memory during query execution. This may result in saving save space because only a subset of layers of the data is stored.

The tables 330 and 331 are provided for example purposes for describing one or more embodiments of the present invention. The encrypted values "x32d1" and "xad1b" are also provided for example purpose only to illustrate an encrypted content of respective values "23" and "Alice" obtained after applying the respective cascade encryption scheme.

The Name column of table T 330 may be encrypted by a same or a different encryption scheme than the ID column of table T 330. In this example, the Name column is encrypted using the encryption scheme of diagram 301C using the encryption methods 309A-303B and 303C-303D and the resulting encrypted values are stored in respective column C2 of table T' 331 of the untrusted DBMS2 119.

In another example, and as also indicated in FIG. 4, a same column (e.g., ID column) may be encrypted using an additional encryption scheme and the resulting encrypted values are stored in respective column "C1-extension." For example, column C1 may contain values encrypted by the encryption scheme of diagram 301A and column C1-extension may include values encrypted by the encryption scheme of diagram 301D.

FIG. 4 shows every column of Table T 330 mapped to corresponding encrypted column of Table T' 331. The encryption information of catalog 207 may further include mapping information indicative of the mapping between the columns such that the rewriter 205 may access the mapping information for rewriting queries. The encryption information may further indicate which cascade encryption scheme is used for encrypting each of the columns of the table 330.

Figure 5:
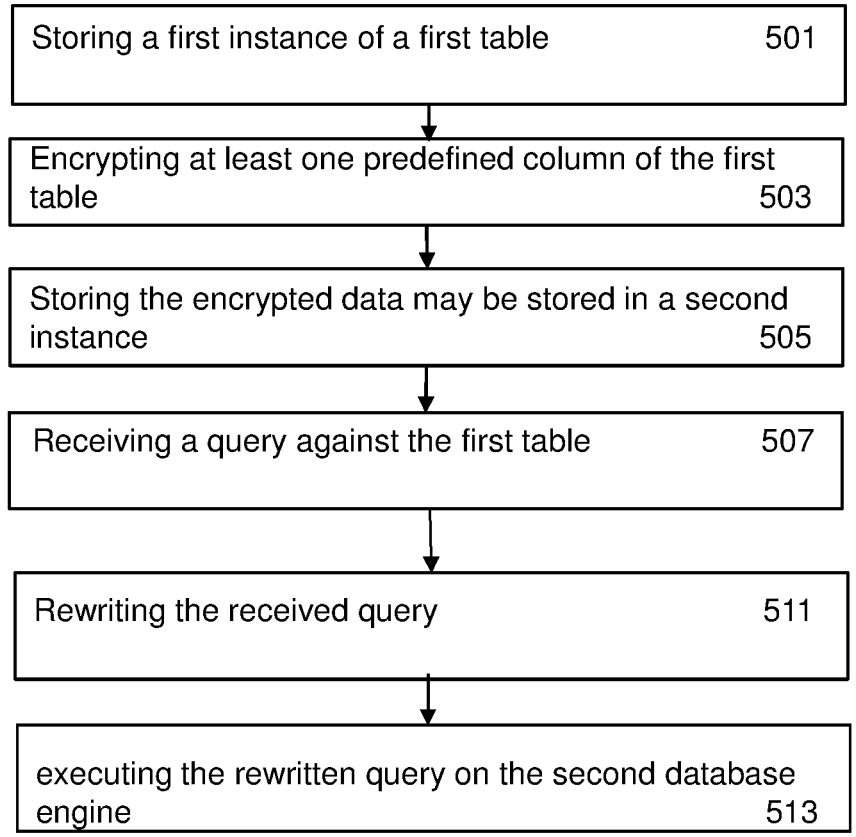
FIG. 5 is a flowchart of a method for processing queries in a database system in accordance with one or more embodiments of the present invention.

Turning now to FIG. 5, a flowchart of a method for processing queries in a database system that includes at least two database engines is generally shown in accordance with one or more embodiments of the present invention.

At block 501 a first instance of a first table is stored in a first database engine in plaintext. The table 330 of FIG. 4 may be used as the first table of FIG. 5 for example purposes. The first table 330 may, for example, be received by the first database engine, such as first computer system 101, for storage of the first data table. The first instance of the first table 330 is a copy of the data of the first table that has a given format (e.g., a plaintext or unencrypted format).

At block 503, at least one column (e.g., ID and/or Name) of the first table 330 is be encrypted multiple times, each time using a method from a set of encryption methods (e.g., 303A-303D) in accordance with their order defined by a given one or more cascade encryption schemes. This results in a respective set of encrypted columns. Each value or attribute value of the ID column may be encrypted using the set of encryption methods. For example, the encryption of each column of the at least one column (e.g., ID and/or Name) may result in a respective set of encrypted columns (e.g., two sets of encrypted columns, one for the ID column and the other for the Name column).

For example, using the encryption scheme of diagram 301A, a first encrypted column results from the application of the encryption method 303A on the ID column. The first encrypted column is encrypted next using the encryption method 303B, resulting in a second encrypted column. The second encrypted column is encrypted using encryption method 303C, resulting in a third encrypted column. The third encrypted column is encrypted using encryption method 303D, resulting in a fourth encrypted column. The resulting set of columns includes the first, second, third and fourth encrypted columns.

At least one column of the first table to be encrypted may be user defined (e.g., a selection of the column to be encrypted is received from a user).

In an exemplary embodiment, the table loader 209 or query engine 203 is configured to read the encryption information of catalog 207 to identify the encryption scheme that can be used for encrypting the ID column of the first table. Using the encryption information, the column to be encrypted is associated with an encryption scheme such as the encryption schemes defined with reference to FIG. 3. When the query engine 203 performs the encryption, the encrypted data is passed to the table loader 209.

At block 505 of FIG. 5, a subset of the set of encrypted columns is stored in a second instance of the first table at the second database engine. If more than one column is encrypted in block 503, a subset of each resulting set of the encrypted columns is stored in the second instance of the first table. Following the above example, a subset of the set of encrypted columns of the ID column are stored in second instance of the first table at the second database engine and another subset of the set of encrypted columns of the Name column are stored in second instance of the first table at the second database engine.

The table loader 209 may send the encrypted data to the second database engine. For example, the table loader 219 may receive the subset of encrypted columns from the table loader 209 and store the received encrypted data in a tabular format resulting in the second instance 331 of the first table 330. The encrypted data may be received in tabular form or value by value. The subset of encrypted columns may be created at the trusted DBMS before being sent to the untrusted DBMS for storage as a second instance of the first table. In another example, the encrypted data is received at the second database engine in comma separated values (CSV) format. For example, the table loader 209 may encrypt each attribute value (value by value) of the column multiple times (using multiple encryption methods of the scheme) and send the end value (in CVS format) to the untrusted DBMS2 119 in order to store the end value in the second instance of the first table. In another example, if the encryption scheme includes three encryption methods, the (value by value) encryption of a value of the column with the first method may result in a first encrypted value and the first encrypted value may be encrypted with the second method resulting in a second encrypted value and the application of the third method on the second encrypted value results in the end value. In this example, the second encrypted values and the end value may be sent (e.g. in CSV format) to the untrusted DBMS2 119 in order to store them in the second instance of the first table. Following the above example, the subset (or each of the subsets if there are multiple subsets) of columns include part of the first, second, third and fourth encrypted columns.

In another example, the subset of columns (or each of the subsets if there are multiple subsets) includes the encrypted column that results from applying all the encryption methods of the encryption scheme (e.g., following the above example the subset of columns include the fourth encrypted column). Storing only a subset of columns saves storage space. Following the above example, the subset of encrypted columns of the ID column includes the fourth column that results from encrypting the ID column by the four encryption methods 303A-303D. The subset of encrypted columns of the Name column includes the fourth column that results from encrypting the Name column by the four encryption methods 303A-303D.

In block 507, a query against the first table is received. The query indicates a query operation on the one or more columns that have been encrypted and stored in accordance with blocks 503 and 505. The query may be received at the trusted DBMS1 109. For example, the query may include a read request for reading a column of the first table 330. In another example, the query may include a selection criterion involving one or more columns of the first table 330.

Following the example of the first table 330, a received query may be as follows in SQL statements: "SELECT*FROM T WHERE ID=23 ORDER BY(Name)", requiring IDs having a value of 23 and ordered by their names.

In block 509, the encryption information (e.g. stored in catalog 207) is used for identifying the encryption method of the given one or more cascade encryption schemes that allows the query operation on data encrypted by the identified encryption method. For example, the identifying of the encryption method may be performed for each query operation of the query. If using the encryption information does not result in identifying any method, the query (without being rewritten) may be executed on the first table.

The encryption information may, for example, indicate that the ID column is mapped to encrypted columns C1 and C1-extension of table T' 331 and that they are encrypted using the cascade encryption scheme of diagram 301A and 301D respectively. The column C1-extension may be created in addition to column C1 in case the HOM encryption method is not compatible with encryption methods of the scheme of diagram 301A and thus cannot be combined or added to the encryption scheme of diagram 301A. However, if the HOM method is compatible with encryption methods of scheme of diagram 301A, an additional column is not needed because the HOM encryption method may be added to that scheme (e.g. as indicated in scheme of diagram 301B) and only one column C1 is required. In addition, the encryption information may indicate that the Name column is mapped to encrypted column C2 which resulted from another encryption scheme of diagram 301C. Thus, using the encryption information it may be determined that the encryption schemes of diagrams 301A and 301D have been used to encrypt the ID column, and encryption scheme of diagram 301C has been used to encrypt the Name column.

Using the encryption information, it may be determined which encryption methods of the determined encryption schemes allows the execution of the query operations "WHERE ID=23" and "ORDER BY(Name)".

For example, the query operation involving "WHERE ID=23" is an equality predicate that can be executed on data encrypted by a deterministic encryption method. The encryption scheme of diagram 301D does not allow the predicate query because it does not include a deterministic encryption method. The encryption scheme of diagram 301A, however, includes a deterministic encryption method 303A, 303B or 303C. The encryption method 303C, 303B or 303A may thus be identified in block 509 as allowing the equality predicate. In this example, the encryption method 303C of the encryption scheme of diagram 301A may be identified as allowing the query operation involving "WHERE ID=23". The selection of the encryption method 303C instead of 303A and 303B may be based on the fact that it is the most secure method because it is ordered lower than the two encryption methods 303A and 303B. For example, a specific column key (e.g., Ke-C1-DET in 303C) may not decrypt cypher text of other columns using the same encryption method and the same universal key, whereas the universal key Ku-OPE in 303A may do, since 303A and 303B are less secure and wrapped with more layers than 303C (universal keys may allow JOIN operations across columns).

The query operation involving "ORDER BY(Name)" is an order operation that can be executed on data encrypted by an order preserving encryption method. Following the present example, the Name column is encrypted by the encryption scheme of diagram 301C only, and thus the identification of the encryption method that allows the order operation may be performed on the encryption scheme of diagram 301C. The encryption scheme of diagram 301C includes an order preserving deterministic encryption method 309A or 309B. The encryption method 309B may be identified in block 509 as allowing the order operation. The selection of the encryption method 309B instead of 309A may be based on the fact that it is the most secure method. In addition, by selecting the encryption method 309B, only the corresponding column specific key Ke-C2-SEARCH may be passed to the untrusted DBMS and revealed in memory instead of universal key Ku-SEARCH (of encryption method 309A) which can decrypt more cyphertext of the columns that are encrypted in the same encryption SEARCH and with the same universal key Ku-SEARCH. Similarly, in case the same encryption scheme of diagram 301A is used for encrypting the Name column, the encryption method 303B may be identified as allowing the order operation.

In block 511, the received query is rewritten (e.g., by rewriter 205) against the second instance 331 of the first table 330 based on the identified one or more encryption methods.

For example, rewriter 205 may retrieve the mapping information between table T 330 and table T' 3301, from catalog 207. Rewriter 205 retrieves the encryption key Ke-C1-DET of the identified encryption method 303C from the catalog 207, and then the rewriter 205 encrypts the value 23 (from the received query) to "x4e2b" using the identified encryption method 303C and the encryption key Ke-C1-DET.

Rewriter 205 further retrieves encryption keys necessary for rewriting the received query such as Ke-C1-RND, Ke-C2-RND, Ke-C2-DET and initialization vectors C1-IV, C2-IV for the received query. An initialization vector may be a random number that may be used in combination with the respective key for encrypting and/or decrypting data. At least part of the retrieved keys and initialization vectors may be sent or passed to the untrusted DBMS2 119 in order to be used for performing decryption operations indicated in the rewritten query.

For example, the subset of columns stored in the second instance of the first table includes the outermost layer of encrypted data. Thus, in order to execute the query on encrypted data of the untrusted DBMS2 119, the encrypted data of the untrusted DBMS2 119 is decrypted to a level that corresponds to the level of the identified encryption method. For example, for executing the equality predicate of the received query, the RND encryption layer of data column C1 of the untrusted DBMS2 119 may be decrypted. For executing the order operation of the received query, the RND encryption layer of data and the DET encryption layer of data of column C2 of the untrusted DBMS2 119 may be decrypted. For that user UDFs may be used.

For example, DECRYPT_RND_UDF and DECRYPT_DET_UDF are UDF implementations (e.g. of key decryptor 218) that may be used to decipher layers of ciphertext, namely, to peel off encryption layers. DECRYPT_RND_UDF peels off the RND layer and DECRYPT_DET_UDF peels off the RND and the DET layers.

Rewriter 205 thus rewrites query operation "ID=23" to "DECRYPT_RND_UDF(C1, Ke-C1-RND, C1-IV)= 'x4e2b'" that can be executed on the second instance 331 of the first table 330.

The function DECRYPT_RND_UDF may be configured to decrypt the outermost layer of the value in the column C1 by using the encryption key Ke-C1-RND and an initialization vector C1-IV. For example, DECRYPT_RND_UDF (C1, Ke-C1-RND, C1-IV) may return values (C1-DET) of C1 encrypted deterministically by the third encryption method 303C, so this equality predicate C1-DET='x4e2b' can be performed. The encrypted value C1-DET may be stored in memory and sent to query engine 217. Since C1-DET, the output value of DECRYPT_RND_UDF( ), is deterministically encrypted, and "x4e2b" is encrypted (e.g., by query engine 203) using the same key Ke-C1-DET, query engine 217 may be able to perform the following equality predicate DECRYPT_RND_UDF(C1, Ke-C1-RND, C1-IV)=x4e2b. This means, that for every row of C1, if its encrypted value C1-DET fulfills C1-DET=x4e2b, this matching row is returned and C1-DET only exists in temporary query working memory.

Rewriter 205 rewrites the query operation "ORDER BY(Name)" to "ORDER BY(DECRYPT_DET_UDF(C2, Ke-C2-RND-DET, C2-IV))". DECRYPT_DET_UDF(C2, Ke-C2-RND-DET, C2-IV) decrypts the RND layer and DET layer and returns values of C2 encrypted in an order-preserving encryption scheme by the identified encryption method 309B, so ORDER BY can be performed. The function DECRYPT_DET_UDF is configured to decrypt the outermost layer of the value in the column C2 by using the key Ke-C2-RND and the initialization vector C2-IV. This yields the encrypted value C2-DET in memory, and it is configured to further decrypt C2-DET in memory using Ke-C2-DET. This yields the encrypted value C2-OPE-DET, which is encrypted in order-preserving deterministic encryption scheme. Since C2-OPE-DET—the output value of DECRYPT_DET_UDF( ) is order-preserving, and query engine 217 may perform the following sorting operations on C2: ORDER BY (DECRYPT_DET_UDF(C2, Ke-C2-RND, Ke-C2-DET, C2-IV)). This means that all matching rows will be sorted by the order of the decrypted values C2-OPE-DET, and it will be sorted in the same order as original values of the Name column of Table T 330.

The resulting rewritten query may be as follows:
SELECT C1, C2 FROM T' WHERE DECRYPT_RND_UDF(C1, Ke-C1-RND, C1-IV)='x4e2b' ORDER BY(DECRYPT_DET_UDF(C2, Ke-C2-RND-DET, Ke-C2-DET, C2-IV)).

The rewritten query may be processed at the second database engine in block 513 on the second instance 331 of the first table, where the key decryptor 218 executes the UDF functions of the rewritten query as described above and returns the resulting encrypted data to the query engine 217 in order to compute the rewritten query by the query engine 217. The results of the computation of the rewritten query are sent to the query engine 203 of the trusted DBMS1 109. For example, the results of processing the rewritten query may be data encrypted with the identified encryption method.

Following the example, after resolving the equality predicate and ORDER BY, query engine 217 returns the encrypted results C1, C2 to the trusted DBMS1 109. The query engine 203 decrypts the results using keys such as Ke-C1 and Ke-C2 received or obtained from the catalog 207 in order to provide the results in plaintext to the client that has submitted the query.

In cases where the query may not be rewritten (e.g., for missing encrypted columns corresponding to columns referred to in the received query or the identifying step may not result in any identified method), the query may be executed on the first table at the first database engine.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "includes," "including," "includes," "including," "has," "having," "contains" or "containing," or any other variation thereof, are intended to cover a non-exclusive inclusion. For example, a composition, a mixture, process, method, article, or apparatus that includes a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product comprising a non-transitory computer readable storage medium having program instructions embodied therewith, the program instructions executable by a processor to cause the processor to perform operations comprising:
    storing a first instance of a first table in a first database engine of a database system, the storing in plain text;
    providing a cascade encryption scheme including an ordered set of compatible encryption methods, the encryption methods including a first encryption method and a second encryption method different than the first encryption method:
    encrypting a column of the first table by successively applying each of the encryption methods in accordance with the order, resulting in a single encrypted column, wherein the successively applying includes an output of the first encryption method being input to the second encryption method;
    storing the single encrypted column in a second instance of the first table;
    storing the second instance of the first table in a second database engine of the database system; wherein the storing a first instance of the first table, the providing, the encrypting, and the storing the second instance of the first table are automatically performed in response to storing the first table in the first database engine; and wherein the database system is a hybrid online transaction processing (OLTP) system and online analytical processing (OLAP) database system, the first database engine configured for performing OLTP processes, and the second database engine configured for performing OLAP processes;
    maintaining encryption information about the ordered set of encryption methods and encryption keys used for encryption in the database system;
    receiving a query against the first table, the query indicating a query operation on at least the column;
    using the encryption information to identify the encryption method of at least the cascade encryption scheme that allows the query operation on data encrypted by the identified encryption method;
    rewriting the received query against the second instance of the first table based at least on the identified encryption method; and
    processing the rewritten query on the second instance of the first table.

2. The computer program product of claim 1, wherein the rewritten query comprises a processing operation on the single encrypted column for processing data encrypted by the identified encryption method.

3. The computer program product of claim 1, wherein the rewritten query comprises a decryption operation for decrypting the single encrypted column until reaching a level of the identified encryption method.

4. A database system comprising:
    a first database engine; a second database engine;
    a memory having computer readable instructions; and
    one or more processors for executing the computer readable instructions, the computer readable instructions controlling the one or more processors to perform operations comprising:
    storing a first instance of a first table in the first database engine in plaintext;
    providing a cascade encryption scheme including an ordered set of compatible encryption methods, the encryption methods including a first encryption method and a second encryption method different than the first encryption method:
    encrypting at least one column of the first table by successively applying each of the encryption methods in accordance with the order, resulting in a single encrypted column, wherein the successively applying includes an output of the first encryption method being input to the second encryption method;
    storing the single encrypted column in a second instance of the first table;
    storing the second instance of the first table in the second database engine; wherein the storing a first instance of the first table, the providing, the encrypting, and the storing the second instance of the first table are automatically performed in response to storing the first table in the first database engine; and wherein the database system is a hybrid online transaction processing (OLTP) system and online analytical processing (OLAP) database system, the first database engine configured for performing OLTP processes, and the second database engine configured for performing OLAP processes;
    maintaining encryption information about encryption methods and encryption keys used for the encryption in the database system;
    receiving a query against the first table, the query indicating a query operation on the column;
    using the encryption information for identifying the encryption method of at least the cascade encryption scheme that allows the query operation on data encrypted by the identified encryption method;
    rewriting the received query against the second instance of the first table based at least on the identified encryption method; and
    processing the rewritten query on the second instance of the first table.

* * * * *